United States Patent [19]

Jan et al.

[11] Patent Number: 5,393,409
[45] Date of Patent: Feb. 28, 1995

[54] HYDROCRACKING PROCESS USING A CONTROLLED POROSITY CATALYST

[75] Inventors: Deng-Yang Jan, Elk Grove Village; Brian Wood, Glenview, both of Ill.

[73] Assignee: UOP, Des Plaines, Ill.

[21] Appl. No.: 28,062

[22] Filed: Mar. 8, 1993

[51] Int. Cl.$^6$ ............................................. C10G 47/10
[52] U.S. Cl. .................................. 208/108; 208/109; 208/110; 208/111; 208/112
[58] Field of Search ............... 208/108, 109, 110, 111, 208/112

[56] References Cited

U.S. PATENT DOCUMENTS

| | | | |
|---|---|---|---|
| 4,115,248 | 9/1978 | Mulasky | 208/112 |
| 4,225,421 | 9/1980 | Hensley, Jr. et al. | 208/112 |
| 4,356,113 | 10/1982 | Lim et al. | 252/455 Z |
| 4,435,278 | 3/1984 | Chen | 208/251 H |
| 4,485,005 | 11/1984 | O'Hara | 208/111 |
| 4,661,239 | 4/1987 | Steigleder | 208/111 |

*Primary Examiner*—Helen M. S. Sneed
*Assistant Examiner*—Walter D. Griffin
*Attorney, Agent, or Firm*—Thomas K. McBride; John F. Spears, Jr.

[57] ABSTRACT

A hydrocracking catalyst and a process using it are described. The catalyst comprises a dealuminated zeolite bound into a highly porous amorphous support matrix. The catalyst is characterized by its low piece density and a bimodal pore distribution, with the unfinished catalyst having a sizeable amount of macropores having diameters between 5,000 and 9,000 Angstroms. A high amount of mesopores between about 56 and about 297 Angstroms is also desired. The presence of pores between 300 to 500 Angstroms and greater than 10,000 Angstroms in diameter is minimized.

7 Claims, 3 Drawing Sheets

Figure 1
PORE SIZE DIST.
HG INTRUSION

Figure 3
PORE SIZE DIST.
N2 ADSORPTION

HYDROCRACKING PROCESS USING A CONTROLLED POROSITY CATALYST

FIELD OF THE INVENTION

The invention relates to the widely employed hydrocarbon conversion process referred to as hydrocracking. The invention relates to a petroleum refining process wherein a broad boiling point range mixture of hydrocarbons such as a heavy vacuum gas oil is contacted with a hydrocracking catalyst in admixture with hydrogen for the purpose of converting the charge material into hydrocarbons having a lower average molecular weight. The subject invention is specifically directed to the use of a novel catalyst characterized by a bimodal pore structure and a significant percentage of pores in the 5,000 to 9,000 Angstrom range.

RELATED ART

Hydrocracking processes are well developed and are used commercially in a number of petroleum refineries for the conversion or upgrading of mixtures of hydrocarbons to more valuable products. Hydrocracking may be employed for the conversion of a light material such as a naphtha to lighter materials such as LPG if market conditions dictate but is more normally applied to the conversion of a relatively heavy or residual material such as a vacuum gas oil to gasoline or diesel fuel.

A specific example of a hydrocracking process intended for the production of middle distillates is provided in U.S. Pat. No. 4,661,239 issued to K. Z. Steigleder, which is incorporated herein by reference. This reference describes hydrocracking catalysts containing Y zeolites of specific unit cell sizes, typical hydrogenation metals, inorganic oxide matrix materials and operating conditions.

The importance of pore volume distribution on catalyst performance has been recognized in the art. For example U.S. Pat. No. 4,435,278 issued to H. C. Chen teaches the use of a bimodal catalyst containing used FCC catalyst. The catalyst of this reference has at least 5% of its pore volume provided as pores having diameters greater than 1000 Angstroms.

U.S. Pat. No. 4,356,113 issued to J. Limm et al teaches the incorporation of carbon blacks of various sizes into catalyst precursors to give desired pore size distributions including bimodal pore volume distributions. The reference is also useful for its extensive discussion of the techniques used to measure and characterize pore volumes of catalyst supports. Catalysts described in this reference were tested using a standard micro activity (MAT) test normally employed to test FCC catalysts.

U.S. Pat. No. 4,485,005 issued to M. J. O'Hara discloses the addition of a surfactant during the preparation of a zeolite hydrocracking catalyst results in an increase in middle distillate production.

BRIEF SUMMARY OF THE INVENTION

The invention is an improved hydrocracking process which employs a bimodal catalyst exhibiting a lower middle distillate yield decline pattern. The catalyst also exhibits increased stability which is believed related to reduced reactant diffusional resistance. The process is characterized by the use of a catalyst comprising (1) a dealuminated Y zeolite and (2) an inorganic matrix preferably comprising silica-alumina and/or alumina, with the non-zeolitic portion of the catalyst having a bimodal pore volume distribution characterized by the provision of at least about 55% and preferably between about 60 and about 80% of the total catalyst pore volume in pores between 35 and 100 Angstroms in diameter and at least about 5 volume percent of the total pore volume of the catalyst being provided by pores between 5,000 and 10,000 Angstroms.

One broad embodiment of the invention may be characterized as a hydrocracking process which comprises the steps of passing hydrogen and a feed stream into a hydrocracking reaction zone, with the feed stream having a 10 percent boiling point above about 316° C. (600° F.), with the reaction zone containing a bed of catalyst comprising a zeolite component and a metal component chosen from the group consisting of platinum, palladium, tungsten, molybdenum, zinc, cobalt, nickel and iron, said zeolite component being fixed in a nonzeolitic inorganic oxide support component, with the unfinished catalyst being characterized by a piece density of from 0.8 to 0.9 g/cc, a total pore volume of about 0.4 to about 0.7 ml/g and by a pore volume distribution providing at least about 5% of the total pore volume of the unfinished catalyst in pores having an average pore diameter of from 5,000 to 10,000 Å and with less than about 1% of the total pore volume of the unfinished catalyst being provided by pores having an average pore diameter more than 10,000 Å, and with the reaction zone being operated at hydrocracking conditions which cause the production of a reaction zone effluent stream comprising hydrogen, hydrocracking product hydrocarbons and unconverted hydrocarbons; and, recovering a distillate hydrocarbon stream from the reaction zone effluent.

DETAILED DESCRIPTION

Hydrocracking is widely used to reduce the average molecular weight of hydrocarbons and convert the feed stream into a more valuable product. Normally a heavy or middle distillate feed stream is converted into one or more lighter distillate product streams. Advances in the area of hydrocracking have resulted in the development of highly active and selective catalysts. Nevertheless, there is still room for improvement. For instance, zeolitic hydrocracking catalysts tend to suffer from "yield decline". This is a tendency for the desired distillate yield (amount of desired product recovered) to decrease as the catalyst is used. The yield decline for diesel fuel may translate into an increase in some other distillate such as kerosene or naphtha and/or an overall decline in all recovered middle distillate products. Yield decline is a problem because the amount of the desired product decreases and because the overall yield structure changes. This results in the amount of each distillate product changing with time, which requires a compensatory adjustment in refinery operation or product sales. It can also reduce the overall value of the refinery's products.

Yield decline may be due to the need to increase reactor operating temperature to counteract the decrease in catalyst activity which occurs with usage. It is therefore an objective of tile invention to reduce the deactivation rate of hydrocracking catalysts. It is also an objective of the subject invention to provide an improved hydrocracking process by providing a catalyst which has a reduced yield decline. It is a specific objective of the invention to provide a hydrocracking catalyst and a hydrocracking process useful in converting heavy petroleum feeds into middle distillates such as diesel fuel and jet fuel.

The subject process is especially useful in the production of middle distillate fractions boiling in the range of about 300°–700° F. (149°–371 ° C.) as determined by the appropriate ASTM test procedure. In addition, it is expected that useful hydrogenation reactions such as hydrodenitrification and hydrodesuffurization will occur simultaneously with hydrocracking of heavier feedstocks. It is expected the subject catalysts will also be useful in the production of heavier products such as lubrication oils or lighter fractions such as naphtha. The subject catalysts may therefore also contain components such as the nonzeolitic molecular sieves of U.S. Pat. No. 4,880,760 to aid in catalytic dewaxing. Typical feedstocks include virtually any heavy mineral or synthetic oil and fractions thereof. Thus, such feedstocks as straight run gas oils, vacuum gas oils, demetallized oils, deasphalted vacuum residue, coker distillates, cat cracker distillates, shale oil, tar sand oil, coal liquids and the like are contemplated. The preferred feedstock will have a boiling point range starting at a temperature above 160° Celsius but would not contain appreciable asphaltenes. The feed stream should have a boiling point range between 260°–538° C. Preferred feedstocks therefore include gas oils having at least 50% volume of their components boiling above 700° F. (371° C.). The hydrocracking feedstock may contain nitrogen usually present as organonitrogen compounds in amounts between 1 ppm and 1.0 wt. %. The feed will normally contain sulfur containing compounds sufficient to provide a sulfur content greater than 0.15 wt. %. It may also contain mono- and/or polynuclear aromatic compounds in amounts of 50 volume percent and higher.

Hydrocracking conditions employed in the subject process are those customarily employed in the art for hydrocracking processes. Hydrocracking reaction temperatures are in the range of 400° to 1200° F. (204°–649° C.), preferably between 600° and 950° F. (316°–510° C.). Reaction pressures are in the range of atmospheric to about 3,500 psi (24,133 kPa), preferably between 200 and 3000 psi (1,379–20,685 kPa). A temperature above about 316° C. and a total pressure above about 4137 kPa (600 psi) are highly preferred. As lower pressures aid vaporization a pressure below 13,890 kPa is highly preferred. Contact times usually correspond to liquid hourly space velocities (LHSV) in the range of about 0.1 hr$^{-1}$ to 15 hr$^{-1}$, preferably between about 0.2 and 3 hr$^{-1}$. Hydrogen circulation rates are in the range of 1,000 to 50,000 standard cubic feet (scf) per barrel of charge (178–8,906 std. m$^3$/m$^3$), preferably between 2,000 and 30,000 scf per barrel of charge (355–5,343 std. m$^3$/m$^3$).

The reaction zone effluent of a hydrocracking process is typically removed from the catalyst bed, heat exchanged with the feed to the reaction zone and then passed into a vapor-liquid separation zone often referred to as a high pressure separator. Additional cooling can be done prior to this separation. In some instances a hot flash separator is used upstream of the high pressure separator. The material entering the initial separation zone will therefore be a mixed phase stream. The vapors entering this zone will be rich in hydrogen and will contain methane, ethane, and other light hydrocarbons. The gases may also comprise some hydrogen sulfide. The vapor phase from the separator(s) is further cooled and if desired treated to remove hydrogen sulfide prior to use as recycle gas. The liquid phases collected in these separations are typically passed into a product fractionation zone comprising one or more fractionation columns. Product recovery methods for hydrocracking are well known and conventional methods may be employed.

The term product fractionation zone is intended to refer to the fractional distillation column(s) from-which the distillate products produced in the process are withdrawn. The product fractionation zone will produce one or more light distillate (naphtha) and normally two or more middle distillates, e.g., jet fuel and diesel fuel. Individual refineries will seek to adjust the boiling point range and percentage of each distillate product based upon market prices and product specifications. The product fractionation zone may include a stripping column operated at conditions effective to separate tile entering hydrocarbons and other materials into a net overhead stream and a net bottoms stream. The net overhead stream of a stripping column would comprise essentially all of the butane and lower boiling hydrocarbons and other compounds including hydrogen and hydrogen sulfide which enter the stripping column. It must be recognized that some percentage of the reaction zone effluent will normally be "unconverted" hydrocarbons. That is, they will be hydrocarbons having boiling points at temperatures above the desired end boiling point of the heaviest product stream removed from the product column. One or more heavy distillate streams will often be recycled from the product fractionation zone to the reaction zone.

The subject process is distinguished from the prior art hydrocracking processes by several characteristics. One fundamental characteristic is the use of a catalyst containing a Y-zeolite contained in a support matrix which has a unique bimodal pore distribution. One desired characteristic of the subject catalyst is an increase, relative to prior catalysts, in the amount of pore volume provided by relatively small mesopores. This may be seen in a high number of pores and higher pore volume provided in the 35–100 Angstrom range. It is believed this change in porosity in the nonzeolitic component of the support helps counteract the tendency of large metal-organic molecules to block access to the active zeolitio sites of the catalyst.

In a representative example of practicing the subject invention commercially a heavy gas oil would be charged to the process and admixed with any hydrocarbon recycle stream. The resultant admixture of these two liquid phase streams is heated in an indirect heat exchange means and then combined with a hydrogen-rich recycle gas stream. The admixture of charge hydrocarbons, recycle hydrocarbons and hydrogen is heated in a fired heater and thereby brought up to the desired inlet temperature for the hydrocracking reaction zone. Within the reaction zone the mixture of hydrocarbons and hydrogen are brought into contact with one or more beds of the subject solid hydrocracking catalyst maintained at hydrocracking conditions. This contacting results in the conversion of a significant portion of the entering hydrocarbons into molecules of lower molecular weight and therefore of lower boiling point. The charge admixture may be contacted with other catalysts during this same overall process, with these catalysts having different functions, e.g. desulfurization, and/or compositions.

There is thereby produced a reaction zone effluent stream which comprises an admixture of the remaining hydrogen which is not consumed in the reaction, light hydrocarbons such as methane, ethane, propane, butane, and pentane formed by the cracking of the feed hydrocarbons, reaction by-products such as hydrogen sulfide and ammonia formed by hydrodesulfurization and hydrodenitrification reactions which occur simultaneously with the hydrocracking reaction plus the desired product hydrocarbons boiling in the gasoline, jet fuel, diesel fuel, and/or fuel oil boiling point ranges and in addition unconverted hydrocarbons boiling above the boiling point ranges of the desired products. The effluent of the hydrocracking reaction zone will therefore comprise an extremely broad and varied mixture of individual compounds.

The subject process does not intentionally subject the feed or product hydrocarbons to any thermal conversion step or operation. All heating steps are performed solely to adjust temperature and/or vaporize hydrocarbons and are not in preparation for or a part of a thermal cracking or coking step. Substantially all of the heavier hydrocarbons present in the reaction zone effluent stream are normally passed directly into downstream fractionation facilities without intervening conversion steps.

The subject hydrocracking catalysts are preferably prepared using a Y zeolite having the essential X-ray powder diffraction pattern set forth in U.S. Pat. No. 3,130,007. The starting material may be modified by techniques known in the art which provide a desired form of the zeolite. Thus, modification techniques such as hydrothermal treatment at increased temperatures, calcination, washing with aqueous acidic solutions, ammonia exchange, impregnation, or reaction with an acidity strength inhibiting species, and any known combination of these are contemplated. A Y-type zeolite preferred for use in the present invention possesses a unit cell size between about 24.20 Angstroms and 24.45 Angstroms. Preferably, the zeolite unit cell size will be in the range of about 24.20 to 24.40 Angstroms and most preferably about 24.30 to 24.38 Angstroms. The Y zeolite is preferably dealuminated and has a framework $SiO_2Al_2O_3$ ratio greater than 6, most preferably between 6 and 25. The Y zeolites sold by UOP of Des Plaines, Ill. under the trademarks Y-82, LZ-10 and LZ-20 are suitable zeolitic starting materials. These zeolites have been described in the patent literature.

Those skilled in the art are familiar with dealumination techniques such as those described by Julius Scherzer in the article at page 157 of *Catalytic Materials* published by the American Chemical Society in 1984. Other references describing the preparation of dealuminated Y zeolites for use in hydrocracking include U.S. Pat. No. 4,401,556; U.K. Patent 2,014,970; U.K. application 2,114,594A; and U.S. Pat. Nos. 4,784,750; 4,869,803 and 4,954,243. Additional guidance may be obtained from U.S. Pat. Nos. 3,929,672 and 4,664,776. The preferred dealuminated Y zeolite is prepared by a sequence comprising an ion exchange of a starting "sodium Y" zeolite to an "ammonium Y" zeolite and hydrothermal treatment. The ion exchange and hydrothermal treatment are then repeated. The final product should have a sodium content, expressed as $Na_2O$, below about 0.35 and a water adsorption capacity at 25 degrees C. and 10 percent relative humidity of about 3 to 15 weight percent.

As the subject invention centers on the pore structure of the overall catalyst, it is contemplated that other zeolites, such as Beta, Omega, L or ZSM type, could be employed as the zeolitic component of the subject catalyst in place of the preferred Y zeolite. It is also contemplated the subject catalyst could contain two or more different zeolites including an admixture of Y and beta zeolites. The subject catalyst may also contain as the active component a non-zeolitic molecular sieve (NZMS) as characterized in U.S. Pat. No. 4,880,780. The catalyst may contain an admixture of the Y zeolite and NZMS material.

It is preferred that the subject catalyst comprises between 1 wt. % and 20 wt. % of the Y-type zeolite, and preferably between 2 wt. % and 10 wt. %. The zeolitic catalyst composition also comprises a porous refractory inorganic oxide support (matrix) which may form between 80 and 99 wt. %, and preferably between 90 and 98 wt. % of the support of the finished catalyst composite. The matrix may comprise any known refractory inorganic oxides such as alumina, magnesia, silica, titania, zirconia, silica-alumina and the like and combinations thereof.

The matrix preferably comprises silica-alumina and/or alumina. The most preferred matrix comprises a mixture of silica-alumina and alumina wherein said silica-alumina comprises between 15 and 85 wt. % of said matrix. It is therefore also preferred that the support comprises from about 5 wt. % to about 45 wt. % alumina.

The silica-alumina component may be produced by any of the numerous techniques which are rather well defined in the prior art relating thereto. Such techniques include the acid-treating of a natural clay or sand, coprecipitation or successive precipitation from hydrosols. These techniques are frequently coupled with one or more activating treatments including hot oil aging, steaming, drying, oxidizing, reducing, calcining, etc. The pore structure of the silica-alumina commonly defined in terms of surface area, pore diameter and pore volume, may be developed to specified limits by any suitable means including aging a hydrosol and/or hydrogel under controlled acidic or basic conditions at ambient or elevated temperature.

The alumina component of the hydrocracking catalyst may be any of the various hydrous aluminum oxides or alumina gels such as alpha-alumina monohydrate of the boehmite structure, alpha-alumina trihydrate of the gibbsite structure, beta-alumina trihydrate of the bayerite structure, and the like. A preferred alumina is referred to as Ziegler alumina and has been characterized in U.S. Pat. Nos. 3,852,190 and 4,012,313 as a by-product from a Ziegler higher alcohol synthesis reaction as described in Ziegler's U.S. Pat. No. 2,892,858. A preferred alumina is presently available from the Conoco Chemical Division of Continental Oil Company under the trademark "Catapal". The material is an extremely high purity alpha-alumina monohydrate (boehmite) which, after calcination at a high temperature, has been shown to yield a high purity gamma-alumina.

An unfinished catalyst for utilization in the subject hydrocracking process should have a surface area of about 200 to 700 square meters per gram, an average pore diameter of about 20 to about 300 Angstroms, a total pore volume of about 0.10 to about 0.80 milliliters per gram, preferably 0.4–0.7 ml/g, and an apparent bulk density within the range of from about 0.8 to about 1.00 gram/cc. Surface areas above 300 m²/g, e.g., 300 to 500 m²/g or 400–500 m²/g are greatly preferred.

The precise physical configuration of the catalyst such as shape and surface area are not considered to be limiting upon the utilization of the present invention. The catalyst may, for example, exist in the form of pills, pellets, granules, broken fragments, spheres, or various special shapes such as trilobal extrudates, disposed as a fixed bed within a reaction zone. Alternatively, the catalyst may be prepared in a suitable form for use in moving bed reaction zones in which the hydrocarbon charge stock and catalyst are passed either in countercurrent flow or in co-current flow. Another alternative is the use of fluidized or ebulated bed reactors in which the charge stock is passed through a turbulent bed of finely divided catalyst, or a suspension-type reaction zone, in which the catalyst is slurried in the charge stock and the resulting mixture is conveyed into the reaction zone. The charge stock may be passed through the reactor(s) in the liquid or mixed phase, and in either upward or downward flow. The catalyst particles may be prepared by any known method in the art including the well-known oil drop and extrusion methods.

The production of spherical catalyst particles by different methods is described in U.S. Pat. Nos. 4,514,511; 4,599,321; 4,628,040 and 4,640,807. One highly desired form of the catalyst is formed by use of the oil dropping technique such as described in U.S. Pat. Nos. 2,620,314; 3,096,295; 3,496,115 and 3,943,070 which are incorporated herein by reference. The zeolite and silica-alumina must be admixed into the aluminum containing sol prior to the initial dropping step. Other references describing oil dropping techniques for catalyst manufacture include U.S. Pat. Nos. 4,273,735; 4,514,511 and 4,542,113.

The subject catalyst will also comprise a metal hydrogenation component. The metal hydrogenation component is preferably composited with the formed support by impregnation after the zeolite and inorganic oxide support materials have been formed to the desired shape, dried and calcined. Impregnation of the metal hydrogenation component into the nonzeolitic portion of the catalyst particles may be carried out in any manner known in the art including evaporative, dip and vacuum impregnation techniques. In general, the dried and calcined particles are contacted with one or more solutions which contain the desired hydrogenation components in dissolved form. After a suitable contact time, the composite particles are dried and calcined to produce finished catalyst particles. Calcination is usually done at a temperature from 371 to about 760 degrees C. for a period of 0.5–10 hours, preferably from 1 to 5 hours. Further information on techniques for the preparation of hydrocracking catalysts may be obtained by reference to U.S. Pat. Nos. 3,929,672; 4,422,959; 4,576,711; 4,661,239; 4,686,030; and, 4,695,368 which are incorporated herein by reference.

Hydrogenation components may be selected from the Group VIB and Group VII metals and their compounds. References herein to Groups of the Periodic Table are to the traditionally American form as reproduced in the sixth edition of *The Chemical Engineer's Handbook*, J. H. Perry editor published by McGraw-Hill. Generally, the amount of hydrogenation components present in the final catalyst composition is small compared to the other above-mentioned components. A Group VIII metal component generally comprises about 0.1 to about 30% by weight, preferably about 1 to about 20% by weight of the final catalytic composite calculated on an elemental basis. A Group VIB metal component comprises about 0.05 to about 30% by weight, preferably about 0.5 to about 20% by weight of the final catalytic composite calculated on an elemental basis. The total amount of Group VIII metal and Group VIB metal in the finished catalyst is preferably less than 25 wt. percent. The hydrogenation components contemplated for inclusion in the catalyst include one or more metals chosen from the group consisting of molybdenum, tungsten, chromium, iron, cobalt, nickel, palladium, platinum, and mixtures thereof. While listed as being contemplated hydrogenation metals, the use of noble metals such as platinum in the catalyst is not preferred.

The hydrogenation components will most likely be present in the oxide form after a calcination in air following the impregnation step and may be converted to the sulfide form if desired by contact at elevated temperatures with a reducing atmosphere comprising hydrogen sulfide, a mercaptan or other sulfur containing compound. When desired, a phosphorus component may also be incorporated into the catalyst. Usually phosphorus is present in the catalyst in the range of 1 to 30 wt. % and preferably 3 to 15 wt. % calculated as $P_2O_5$. In addition, boron may also be present in the catalytic composite. The presence of phosphorous and boron is not preferred.

It has been discovered that the stability and yield decline problems of contemporary hydrocracking catalysts may be significantly reduced by changes in the pore volume distribution of the overall catalyst. The novel pore volume distribution which brings about this increased performance is thought to increase the ease with which feed, reaction intermediate and/or product molecules move through the catalyst particle to reach active cracking sites (on the zeolite and silica-alumina) or to reach the active hydrogenation metal component.

The subject catalyst will contain pores falling within at least three different size classifications. First, there are the very small pores (less than about 15 Å) which are associated with the zeolite component of the catalyst. The relative amount of the catalyst total pore volume provided by pores less than 15 Å (micropores) is primarily set by the zeolite concentration in the overall catalyst. The second pore diameter category is the mesopore range which extends from 15 to about 600 Å. Most of the mesopores are present in the inorganic oxide (non-zeolitic) support component of the catalyst. The third pore diameter category is the macropore, a term used for pores greater than about 600 Å. The macropore volume may be further broken down by size range.

Figure 1:
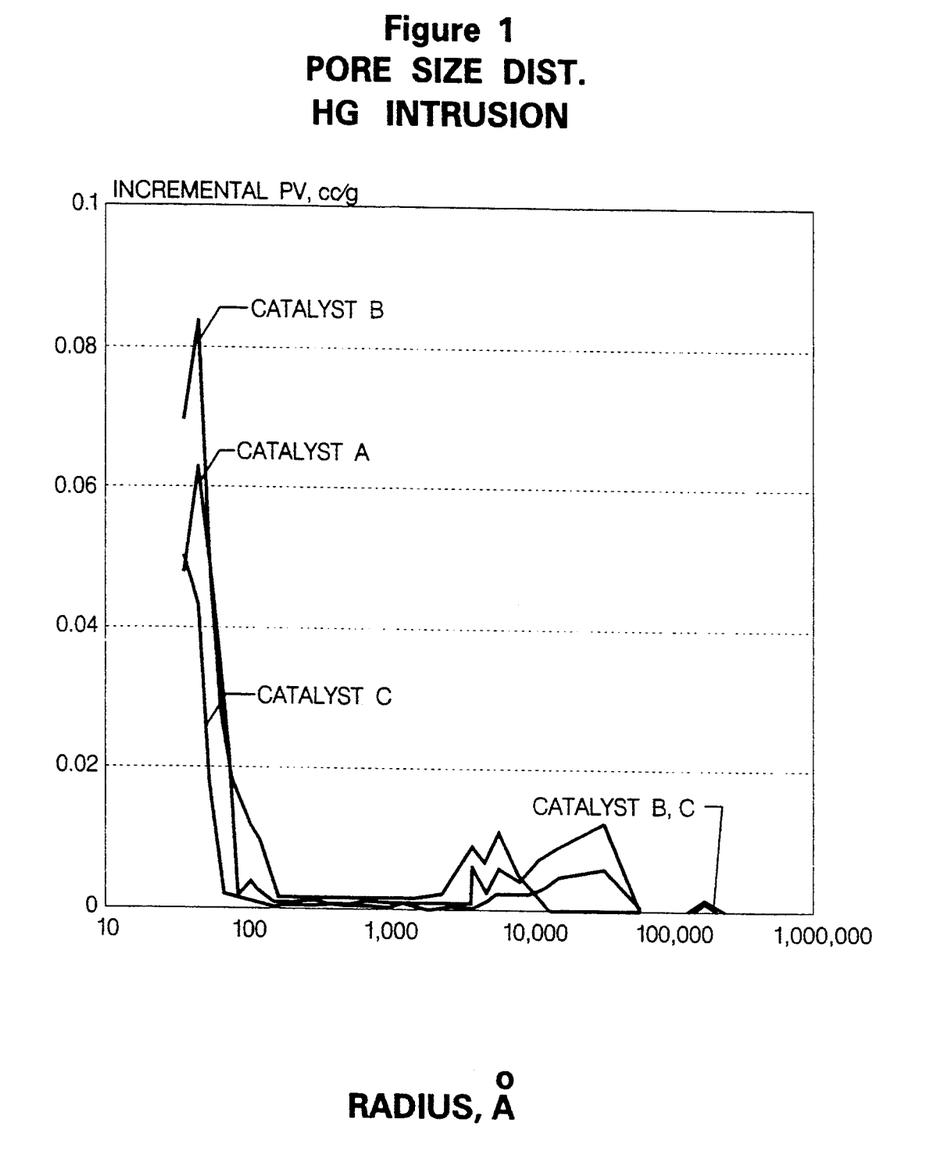
FIG. 1 is a graph of the incremental pore volume distribution by mercury intrusion of three separate catalysts described below.
Figure 2:
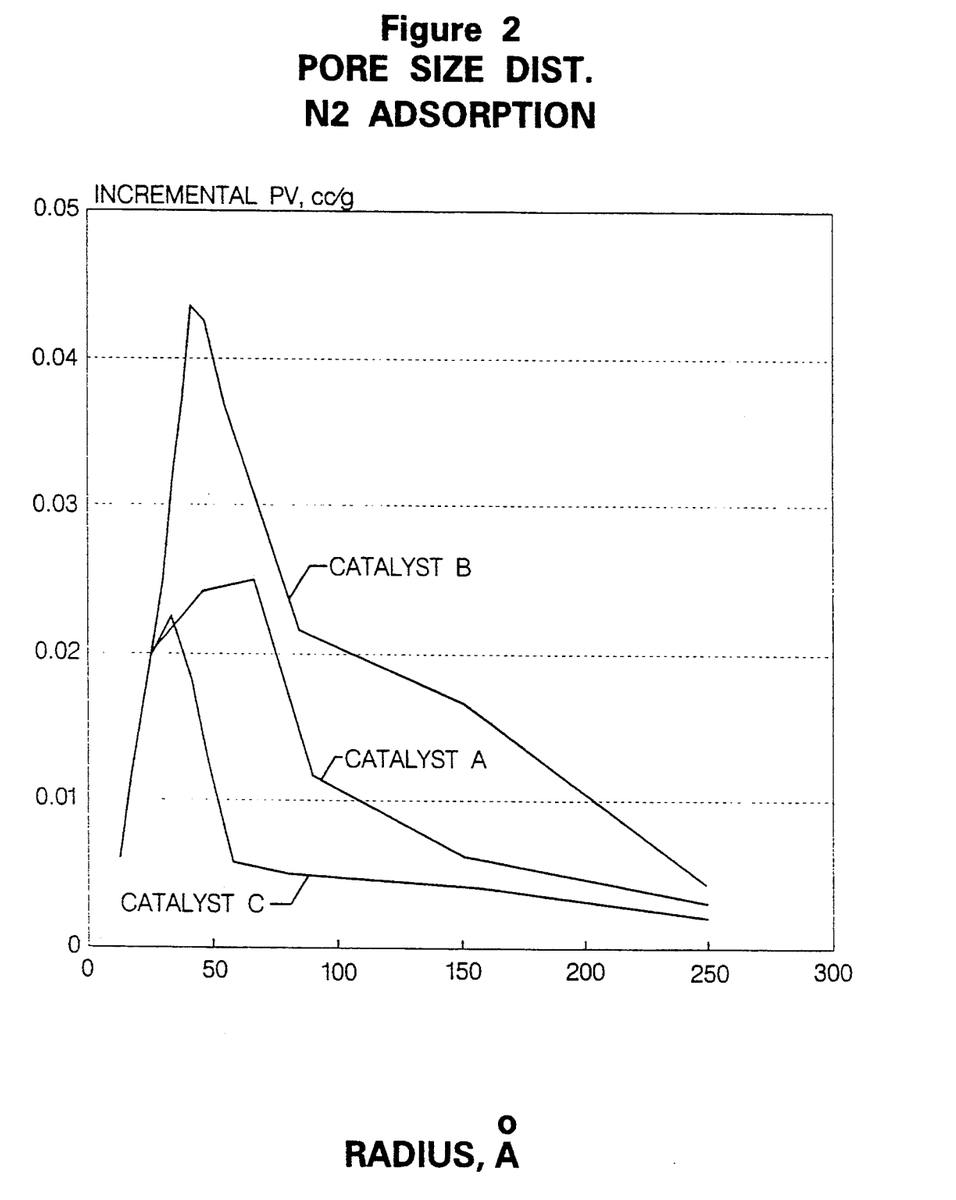
FIG. 2 is a graph of the pore size distribution according to nitrogen adsorption for the same three catalysts.
Figure 3:
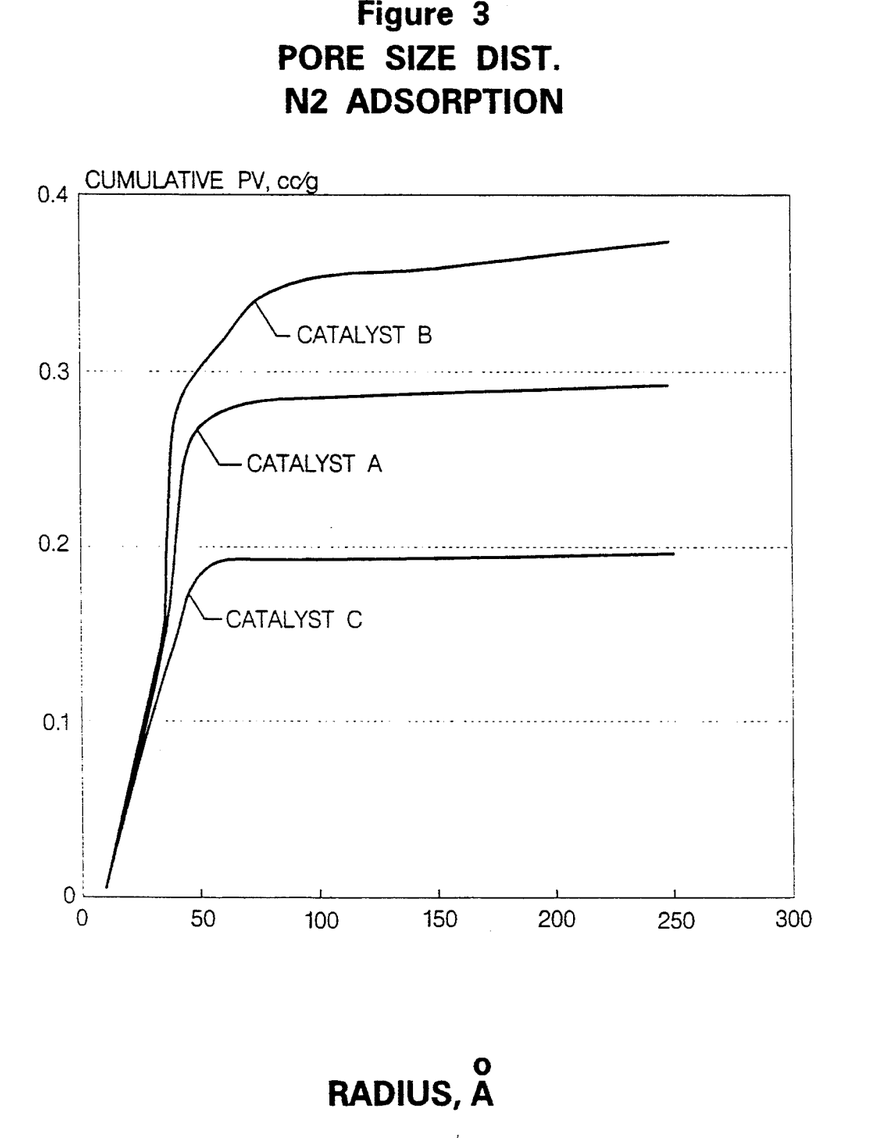
FIG. 3 is a graph of the cumulative pore volumes by nitrogen adsorption of the same catalysts.

The subject process employs a catalyst comprising a bimodal pore distribution characterized by significant pore volumes being present in both the mesopore and macropore range. The catalyst is also characterized by a lower density, which correlates to a higher total pore volume. As the amount of micropores is overwhelmingly set by the zeolite component the following discussion is given primarily in terms of mesopore and macropore pore volumes. The pore volume distribution of three catalysts, exclusive of micropores, is given in the Figures. These three catalysts are described below.

The pore volume distributions of a catalyst may be varied in several ways including changing the materials used in its manufacture. It is preferred that manufacturing techniques, specifically the extrusion step is adjusted as needed to yield the desired density and pore volume distribution. The preferred method of varying these physical properties of the catalyst during extrusion is by the addition of an extrusion aid to the peptized materials which are about to be extruded. While the extrusion aid is a combustible material that would increase catalyst porosity upon its removal during calcination, it is believed that the addition of the extrusion aid also varies the pore volume by changing the amount of energy required during extrusion, which translates into less compressive force applied to the material being extruded. This theory has been verified in studies that have shown a correlation between the amount of energy per unit mass of catalyst required during extrusion and particle density.

Another embodiment of the invention may accordingly be characterized as a process for hydrocracking a heavy hydrocarbon feed stream having a 10 percent boiling point above about 316° C., said process comprising the steps of passing said feedstream into contact with a hydrocracking catalyst comprising a zeolite component and Group VIII and a Group VI B metal components, said zeolite component being fixed in a nonzeolitic inorganic oxide support component, with the unfinished catalyst being characterized by a piece density of from 0.8 to 0.9 g/cc, a total pore volume of 0.4 to 0.7 ml/g, and by a pore volume distribution providing (i) at least 5% of the total pore volume of the unfinished catalyst in pores having an average pore diameter of from 5,000 to 10,000 Å; (ii) at least 20% of the total pore volume of the unfinished catalyst in pores having an average pore diameter between 56 and 297 Å; and, (iii) and with less than 1% of the total pore volume of the unfinished catalyst being provided by pores having an average pore diameter more than 10,000 Å, and with the reaction zone being operated at hydrocracking conditions which cause the production of a reaction zone effluent stream comprising hydrogen, hydrocracking product hydrocarbons and unconverted hydrocarbons; and, recovering a distillate hydrocarbon stream from the reaction zone effluent. The process may be further characterized in that at least about 25 percent of the total pore volume of the unfinished catalyst is provided by pores having an average pore diameter between about 56 and 579 Angstroms.

A reference catalyst containing 9 wt % dealuminated Y zeolite having a silica to alumina ratio of 14 and a unit cell size of 24.29 Å, 16% alumina and 75% silica-alumina was produced by admixing these three materials as dry powders, peptizing the admixture with nitric acid and then extruding the resulting material to yield a 1/16 inch extrudate. This material was dried and calcined at a temperature of 580 degrees centigrade. The formed catalyst base was then impregnated by the well know pore filling technique to yield a catalyst containing 4 wt % NiO and 24% $WO_3$. This catalyst is referred to as Catalyst A.

A catalyst of the subject invention was prepared in the same manner as the reference except that extrusion aids comprising methyl cellulose ethers sold under the trademark Methocel by Dow Chemical, Midland, Mich. and Paraflint Spray 30 wax sold by Moore & Munger Marketing, Inc were added prior to extrusion. 2% Methocel and 1% Paraflint were blended into the zeolite-base material admixture and the admixture was then extruded in the same manner as the prior example. This material was then impregnated to the same metal content. Care was taken to ensure all steps were performed in the same manner as in the prior example except for the addition of the extrusion aid. This catalyst is labeled Catalyst B.

A third catalyst was made using the same preparation technique as the reference catalyst (no extrusion aid) but the extrusion conditions were varied to result in a somewhat different (higher) piece density and lower porosity as compared to the first or reference catalyst. This catalyst is referred to as Catalyst C.

FIG. 1 gives the pore volume distribution by a standard mercury intrusion test. Zeolite pore volume is not included. This Figure very graphically shows the bimodal pore distribution pattern of the three hydrocracking catalysts described above. The mercury intrusion data are useful in providing information over a broad range of mesopores and macropores but does not extend below about 30 Å. One characteristic of these catalysts which may be seen from this figure is the lack of any significant amount of pore volume being provided by pores having an average pore diameter greater than about 250 Å and less than about 5,000Å. All three catalysts also show essentially no pore volume above 40,000 Å.

FIG. 2 presents the pore size distribution as given by nitrogen adsorption by the well-known BET nitrogen adsorption technique (S. Brunauer, P. Emmett and E. Teller, *J. Am. Chem. Soc.* 60, 309 (1938)). This Figure provides data about the smaller mesopores not discernable in FIG. 1 and again indicates that tho very great majority of the mesopore range pore volume is provided by pores less than 200 Å in radius, with the bulk, at least 90%, of the mesopore pore volume being provided by pores less than 100 Å. (Data derived from nitrogen tests are reported in terms of pore radius, while mercury data is in terms of diameter.)

FIG. 3 presents the data of FIG. 2 in a somewhat different manner. While FIG. 2 shows the pore volume increase obtained in moving to larger pores, FIG. 3 shows the total pore volume provided by all mesopores having an average pore radius less than the values along the ordinate (X axis). The way in which the curves for all three catalysts flatten out is evidence that essentially no additional pore volume is being provided by pores over about 200 Å. This Figure also very graphically points out the more porous nature of the superior Catalyst B.

Tables 1 and 2 give the piece density, total pore volume (cc/g) and pore volume distributions for the unfinished catalyst bases and finished catalysts. The numbers in parentheses are the percentage of the pore volumes given by specific pore size ranges.

Examination of the data provide by the tables indicates that the catalyst of the subject invention may be characterized in that the mesopores in the unfinished catalyst having an average pore diameter between 35 and 96 Angstroms provide a total pore volume greater than 0.44 cc/g. It is also evident that the unfinished catalyst may be further characterized in that at least 13% of the pore volume provided by mesopores in the catalyst having an average pore diameter between 35 and 579 Angstroms is provided by mesopores having an average pore diameter between 56 and 96 Angstroms.

The finished catalysts may also be characterized by the percent of large mesopores, defined as the percent of mesopores (35–579 Angstroms) with pore diameters greater than 56 Angstroms, which they contain. Catalyst A had 26.6% large mesopores and catalyst C had 9.6% large mesopores. In comparison catalyst B, the catalyst of the subject invention, had 33.4% large mesopores.

The relative performance of the three catalysts provided in Table 4 was determined by their ability to convert the vacuum gas oil (VGO) feeds characterized in Table 3 in a small scale pilot plant. Catalysts A and C were tested using feed 1 and catalysts A and B were tested using feed 2 The plant was operated at a temperature required to achieve 100 percent conversion of the feed to products having boiling points below 371 degrees C. (700 degrees F.). The plant was operated at a pressure of 12067 k Pa (ga) (1750 psig), a liquid hourly space velocity of 1.6 hr$^{-1}$, a hydrogen circulation rate of 1,781 std m$^3$/m$^3$ (10,000 std. cubic feet/barrel of fresh feed) and a combined feed ratio of 1.2. Plant operations were continued until the accumulated catalyst life was 0.875–1.05 m$^3$/kg (2.5–3.0 BPP).

TABLE 1
PORE SIZE DISTRIBUTION
Hg INTRUSION - UNFINISHED CATALYST BASE

| Catalyst | A | B | C |
|---|---|---|---|
| PD$^1$, g/cc | 0.96 | 0.86 | 1.22 |
| TPV$^2$, | 0.47 | 0.589 | 0.24 |
| 35–56 Å | 0.299 (63.6) | 0.352 (59.8) | 0.158 (65.8) |
| 56–96 Å | 0.059 (12.6) | 0.088 (14.9) | 0.015 (6.3) |
| 96–297 Å | 0.024 (5.1) | 0.052 (8.8) | 0.013 (5.4) |
| 297–579 Å | 0.005 (1.1) | 0.012 (2.0) | 0.004 (1.7) |
| 579–5532 Å | 0.027 (5.7) | 0.053 (9.0) | 0.014 (5.8) |
| 5532–10577 Å | 0.024 (5.1) | 0.031 (5.3) | 0.011 (4.6) |
| >10577 Å | 0.033 (7.0) | 0.002 (0.3) | 0.026 (10.8) |

$^1$Piece Density
$^2$Total Pore Volume

TABLE 2
PORE SIZE DISTRIBUTION
Hg INTRUSION - FINISHED CATALYST

| Catalyst | A | B | C |
|---|---|---|---|
| PD$^1$, g/cc | 1.450 | 1.281 | 1.719 |
| TPV$^2$, | 0.271 | 0.360 | 0.151 |
| 35–56 Å | 0.157 (57.9) | 0.201 (55.8) | 0.113 (74.8) |
| 56–96 Å | 0.033 (12.2) | 0.065 (18.1) | 0.007 (4.6) |
| 96–297 Å | 0.020 (7.4) | 0.03 (8.3) | 0.004 (2.6) |
| 297–579 Å | 0.004 (1.5) | 0.006 (1.7) | 0.001 (0.7) |
| 579–5532 Å | 0.017 (6.3) | 0.041 (11.4) | 0.008 (5.3) |
| 5532–10577 Å | 0.018 (6.6) | 0.018 (5.0) | 0.007 (4.6) |
| >10577 Å | 0.022 (8.1) | 0.0 (0.0) | 0.011 (7.3) |

$^1$Piece Density
$^2$Total Pore Volume

TABLE 3

| Feed Properties | Feed 1 | Feed 2 |
|---|---|---|
| °API | 22.2 | 22.2 |
| Wt. % Sulfur | 2.3 | 2.3 |
| Wt. % N | 0.05 | 0.08 |
| C$_7$ Insolubles | 0.07 | 0.03 |
| Initial BP,* °C. | 211 | 211 |
| 10% BP, °C. | 329 | 342 |
| 50% BP, °C. | 446 | 463 |
| 90% BP, °C. | 540 | 549 |
| Aromatics, wt. %. | 55 | 61 |
| Olefins, wt. % | 0 | 0 |
| Paraffins, wt. % | 45 | 39 |

*Boiling points by ASTM method D-2887

TABLE 4
PHYSICAL CHARACTERISTICS/PERFORMANCE

| Catalyst | A | A$^3$ | B | C$^3$ |
|---|---|---|---|---|
| Unfinished Piece Density, g/ml | 0.960 | 0.960 | 0.857 | 1.22 |
| S.A.*, m$^2$/g | 435 | 435 | 485 | 399 |
| Finished Piece Density, g/ml | 1.45 | 1.45 | 1.28 | 1.72 |
| S.A.*, m$^2$/g | 245 | 245 | 278 | 213 |
| SOR$^1$, degrees C | 412 | 417 | 416 | 415 |
| DAR$^2$, degrees C/BPP | 11.1 | 7.8 | 6.3 | 13.3 |
| Yield Decline, wt %/BPP | 4.9 | 5.2 | 2.9 | 7.8 |

*Surface Area
$^1$Start of run temperature at conversion target
$^2$Deactivation rate, degrees C/barrel/lb catalyst
$^3$Tested with feed 1

Table 4 shows catalyst A is superior to catalyst C and that catalyst B is superior to catalyst A. The deactivation rate of the reference catalyst A was measured as approximately 11.1 degrees C./barrel/lb with feed 2 and 7.8 degrees C./barrel/lb when using feed 1. In comparison Catalyst C deactivated at a much higher rate of approximately 13.3 degrees C./barrel/lb. The more porous subject catalyst B therefore had significantly improved activity-stability and yield-stability and is clearly a superior hydrocracking catalyst.

As all of the materials and preparatory techniques were held constant except those relating to pore volume distribution, there is a clear indication that the total pore volume and the pore volume distribution of the catalyst are important factors influencing hydrocracking catalyst temperature stability and yield decline. A comparison of the data presented via FIGS. 1 and 2 shows the superior performing catalyst has two features which distinguish its pore volume distribution from those of the other catalysts. First, FIG. 2 indicates the superior catalyst has a higher amount of mesopores in the total range up to about 300 Å. Second, FIG. 1 indicates the superior catalyst contain more smaller macropores (5,000–10,000 Å) and virtually no macropores over 10,000 Å. The average macropore diameter is therefore less than 10,000 Å. Table 4 indicates the superior catalyst, Catalyst B, also has a lower piece density and somewhat higher surface area than the other catalysts.

It must be noted that some physical characteristics, such as piece density, of a finished catalyst are dependent upon the amount of hydrogenation metal(s) which is placed upon the catalyst. This must be borne in mind during any comparison of the subject catalyst to those described in the prior art.

What is claimed:

1. A hydrocracking process which comprises the steps of:

(a) passing hydrogen and a feed stream into a hydrocracking reaction zone, with the feed stream having a 10 percent boiling point above about 316° C., with the reaction zone containing a bed of catalyst comprising a zeolite component and a Group VIII metal component, said zeolite component being fixed in a nonzeolitic inorganic oxide support component, with the unfinished catalyst being characterized by a surface area of 300–500 m$^2$/g, a piece density of from 0.8 to 0.9 g/cc, a total pore volume of 0.4 to 0.7 ml/g, and by a pore volume distribution providing at least about 5% of the total pore volume of the catalyst in pores having an average pore diameter of from 5,000 to 10,000 Å, with the mesopores in the unfinished catalyst having an average pore diameter between 35 and 96 Angstroms providing a total pore volume greater than about 0.44 cc/gm and with less than about 1% of the total pore volume of the catalyst being provided by pores having an average pore diameter more than 10,000 Å, and with the reaction zone being operated at hydrocracking conditions which cause the production of a reaction zone effluent stream comprising hydrogen, hydrocracking product hydrocarbons and unconverted hydrocarbons; and, (b) recovering a distillate hydrocarbon stream from the reaction zone effluent.

2. The process of claim 1 further characterized in that the zeolite is a Y zeolite.

3. The process of claim 2 further characterized in that at least about 25 percent of the total pore volume of the unfinished catalyst is provided by pores having an average pore diameter between 56 and 579 Angstroms.

4. The process of claim 3 further characterized in that at least 13% of the pore volume provided by mesopores in the unfinished catalyst having an average pore diameter between 35 and 579 Angstroms is provided by mesopores having an average pore diameter between 56 and 96 Angstroms.

5. A hydrocracking process which comprises the steps of:

(a) passing hydrogen and a feed stream into a hydrocracking reaction zone, with the feed stream having a 10 percent boiling point above about 316° C., with the reaction zone containing a bed of catalyst comprising a zeolite component and a Group VIII metal component, said zeolite component being fixed in a nonzeolitic inorganic oxide support component, with the unfinished catalyst being characterized by a surface area of 400–500 m$^2$/g, a piece density of from 0.9 to 0.8 g/cc, a total pore volume of 0.4 to 0.7 ml/g, with the mesopores in the unfinished catalyst having an average pore diameter between 35 and 96 Angstroms providing a total pore volume greater than about 0.44 cc/gm and by a pore volume distribution providing (i) at least 5% of the total pore volume of the unfinished catalyst in pores having an average pore diameter of from 5,000 to 10,000 Å;

(ii) at least 20% of the total pore volume of the unfinished catalyst in pores having an average pore diameter between 56 and 297 Å; and, (iii) less than 1% of the total pore volume of the unfinished catalyst being provided by pores having an average pore diameter more than 10,000 Å, and with the reaction zone being operated at hydrocracking conditions which cause the production of a reaction zone effluent stream comprising hydrogen, hydrocracking product hydrocarbons and unconverted hydrocarbons; and, (b) recovering a distillate hydrocarbon stream from the reaction zone effluent.

6. The process of claim 5 further characterized in that the zeolite is a Y zeolite.

7. The process of claim 5 further characterized in that at least about 25 percent of the total pore volume of the unfinished catalyst is provided by pores having an average pore diameter between 56 and 579 Angstroms.

* * * * *